United States Patent [19]

Shimada et al.

[11] 3,743,111
[45] July 3, 1973

[54] SYSTEM FOR DISCONNECTING ANY DESIRED CAR IN A TRAIN

[75] Inventors: Hiromitsu Shimada; Kenji Kawado, both of Kobe; Yutaka Nagoya, Ashiya; Toshio Toi, Amagasaki; Shunichi Yamauchi, Kobe, all of Japan

[73] Assignee: Nippon Air Brake Company, Ltd., Fukiai-ku, Kobe, Japan

[22] Filed: Dec. 27, 1971

[21] Appl. No.: 211,871

[30] Foreign Application Priority Data
Dec. 26, 1970 Japan................................ 45/125265

[52] U.S. Cl. ............................................. 213/212
[51] Int. Cl. ........ B61g 1/08, B61g 3/08, B61g 5/06
[58] Field of Search ..................................... 213/212

[56] References Cited
UNITED STATES PATENTS
3,245,553 4/1966 Cope................................... 213/212
3,532,228 10/1970 Beyer.................................. 213/212
3,599,803 8/1971 Cope................................... 213/212

Primary Examiner—Drayton E. Hoffman
Attorney—Vern L. Oldham et al.

[57] ABSTRACT

A system for disconnecting any desired car from a train of cars in which an actuating air supply line and an instruction air line are connected to a compressed air source in a locomotive to extend through the train. Air under low pressure is continuously supplied to the actuating air supply line extending through the cars, and the operator manipulates an on-off control valve in the locomotive by the number of times corresponding to the car number of the desired car to be disconnected. In response to the on-off manipulation, the instruction air conduits in the cars are successively charged with instruction air supplied from the instruction air line and are then exhausted until finally the instruction air conduit in the desired car is charged with air. Then, air under high pressure is supplied through the actuating air supply line to air conduits in the specific car to actuate a coupler unlocking means thereby releasing the coupler.

2 Claims, 5 Drawing Figures

SYSTEM FOR DISCONNECTING ANY DESIRED CAR IN A TRAIN

This invention relates to a system for disconnecting any desired car from a train of passenger cars, freight cars, trolleys and the like.

Various systems have been proposed heretofore for disconnecting a desired car from a train of passenger cars, freight cars, trolleys and the like. However, prior art systems of the kind adapted for electrical or electro-pneumatic control have been defective in that they are complex in structure and costly and cannot be simply applied to freight cars, trolleys and the like. Further, prior art systems of the kind adapted for purely pneumatic control have also been defective in that a considerable length of time is required for the transmission of disconnection instructions to a desired car from a locomotive when the train includes many cars ranging over several hundred meters because, in such a system, a variation in air pressure is transmitted as a signal through an air line extending through the train.

With a view to overcome the above defects, it is a primary object of the present invention to provide a novel and improved system of fully pneumatic type which can reduce the period of time required for disconnection of a desired car from a train, which is simple in structure, and which can reliably operate.

The present invention contemplates the provision of a system in which, in response to the on-off manipulation of an on-off control valve in a locomotive, instruction air conduits in the cars of a train are successively charged with instruction air supplied by an instruction air line and are then exhausted so that the disconnection instruction signal can be successively transmitted from the locomotive to a specific car to be disconnected thereby efficiently and easily carrying out the disconnecting operation. The operator in the locomotive may merely repeat the on-off of the on-off control valve by the number of times corresponding to the car number of the desired car to be disconnected and then manipulates a compressed air supply valve to supply air under high pressure into an actuating air supply line extending through the train thereby releasing the coupler of the desired car. The car number of the desired car to be disconnected may be stored in a computer or auto-counter so that the on-off operation for the disconnection can be automatically carried out. According to the present invention, compressed air at constant low pressure is continuously supplied to the actuating air supply line during the disconnecting operation, and the instruction air conduits in the cars are successively charged with air and then exhausted starting from the first car until finally the instruction air conduit in the desired car is charged with compressed air to prepare for the disconnecting operation. Thus, the period of the on-off operation of the on-off control valve in the locomotive is constant throughout the disconnecting operation and need not be extended with the increase in the distance between the locomotive and the specific car so that the overall period of time required for the disconnection can thereby be reduced. The disconnecting operation according to the present invention can be carried out within a shorter period of time than that required by a conventional system in which such operation is carried out by the combination of selection of a car to be disconnected, feedback of the signal for confirming that the specific car is exactly selected, and application of disconnection instructions after the confirmation of error-free selection. The present invention which eliminates this confirmation step and employs a purely pneumatically operated system is advantageous in that the system is substantially trouble-free and can operate with high reliability, the car selecting operation and car disconnecting operation can be carried out simultaneously by single manipulation, and the system is simple in arrangement and can be manufactured at a greatly reduced cost. Further, the cars can be connected in any direction by virtue of the symmetrical disposition of same parts in each car.

Figure 1:
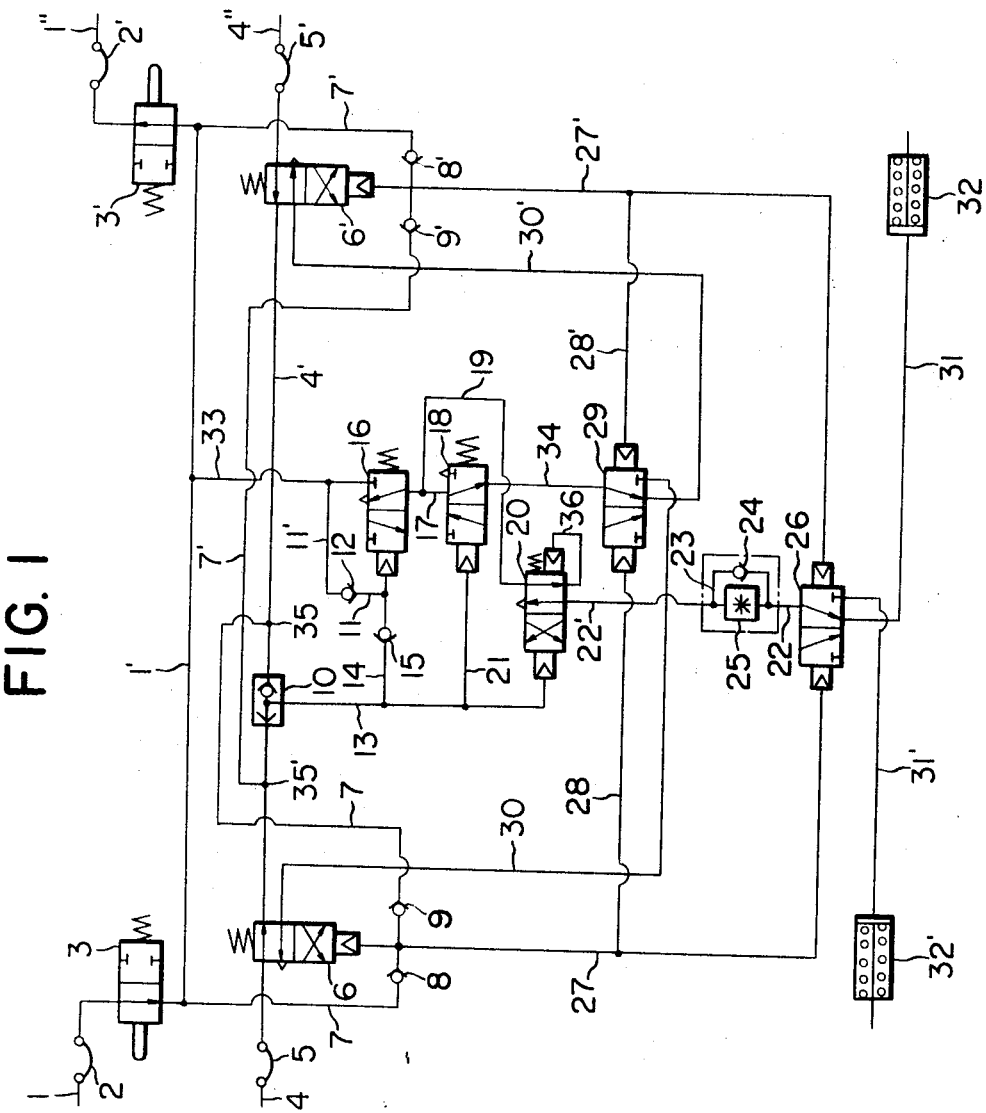
FIG. 1 is a schematic diagram showing parts of a system embodying the present invention.

Referring to FIG. 1 showing parts of a system of the present invention on a car in a train of cars, an actuating air supply conduit 1' forming a part of an actuating air supply line extending through the train is connected to actuating air supply conduits 1 and 1'' in the next adjacent cars through connecting conduits 2 and 2' and cut-off and change-over valves 3 and 3' respectively. An instruction air line extends also through the train and includes instruction air conduits 4, 4' and 4'' as shown in FIG. 1.

Two conduits 7 and 7' are branched from the opposite ends of the actuating air supply conduit 1' to be connected to the instruction air conduit 4' at respective points 35 and 35' intermediate the car body. Two check valves 8 and 9 are interposed in the conduit 7 in such a manner that they do not permit passage of air toward the point 35. Similarly, two check valves 8' and 9' are interposed in the conduit 7' in such a manner that they do not permit passage of air toward the point 35'.

A double check valve 10 is disposed in the instruction air conduit 4' between the intermediate points 35 and 35'. The central port of the double check valve 10 is connected to one end of a pilot conduit 13, the other end of which is connected to the control port of a locked position self-holding change-over valve 20. A pair of pilot conduits 14 and 21 are branched from mid points of the conduit 13. The pilot conduit 14 is connected through a check valve 15 to the control port of a supply pressure self-holding change-over valve 16. Further, the pilot conduit 14 is connected to the actuating air supply conduit 1' through the valve 15, a branch conduit 11, a check valve 12 (which permits passage of air toward the conduit 1'), and conduits 11' and 33. The other end of the conduit 33 communicates with the body of the supply pressure self-holding change-over valve 16.

The pilot conduit 21 is connected to the control port of an instruction air change-over valve 18. One of the change-over ports of the change-over valve 18 communicates through a conduit 17 with the supply pressure self-holding change-over valve 16, while the other change-over port of the change-over valve 18 communicates through a conduit 34 with an instruction direction change-over valve 29 which acts to selectively connect the conduit 34 to conduits 30 and 30'. The two control ports of the change-over valve 29 are connected to conduits 27 and 27' through conduits 28 and 28' respectively. The conduits 27 and 27' communicate at one end with the control ports of an unlocking air cylinder change-over valve 26 and at the other end with the control ports of instruction direction change-over valves 6 and 6' through the points between the check valves in the conduits 7 and 7' respectively.

One of the change-over ports of the unlocking air cylinder change-over valve 26 communicates with the locked position self-holding change-over valve 20 through a conduit 22, a pressure controlled valve 25 and a conduit 22'. This pressure controlled valve 25 permits passage of air therethrough only when an air pressure higher than a predetermined setting is applied thereto in the forward direction. A check valve 24 is connected between the conduits 22 and 22' in parallel with the valve 25 in a direction as shown. The other change-over port of the change-over valve 26 is selectively connectable to unlocking cylinders 32 and 32' through respective conduits 31 and 31'.

The other change-over port of the locked position self-holding change-over valve 20 communicates with the conduit 17 through a conduit 19. The instruction air conduit 4' is connected by connecting conduits 5 and 5' to the instruction air conduits 4 and 4'' in the next adjacent cars. The instruction air conduit 4' communicates adjacent to its ends with the change-over ports of the respective instruction direction change-over valves 6 and 6', and the conduits 7 and 7' are branched from the respective points 35 and 35' of the conduit 4' between the change-over valves 6 and 6', the double check valve 10 being interposed between the points 35 and 35' as described.

The locomotive is provided with a source of compressed air, a compressed air control valve which can be changed over for selectively supplying air under low pressure to the actuating air supply line including the conduits 1, 1', 1'', . . . . and to the instruction air line including the conduits 4, 4', 4'', . . . . and air under high pressure to the actuating air supply line for the purpose of disconnecting the specific car, and an on-off control valve for the repeated supply and exhaust of compressed air to and from the instruction air line. Preferably, an automatic actuating device for the sequential control of the system is disposed in the locomotive.

The operation of the system will now be described with reference to FIGS. 2 to 5. In operation, the operator in the locomotive manipulates the compressed air control valve to supply air under low pressure (about 3 Kg/cm²) to the actuating air supply line including the conduits 1, 1', 1'', . . . . and then repeats the on-off of the on-off control valve by the number of times corresponding to the car number of the specific car to be disconnected couting from the first car. After the above operation, the operator changes over the compressed air control valve to the high pressure side to supply air under high pressure (about 6 Kg/cm²) to the actuating air supply line including the conduits 1, 1', 1'', . . . .

Figure 2:
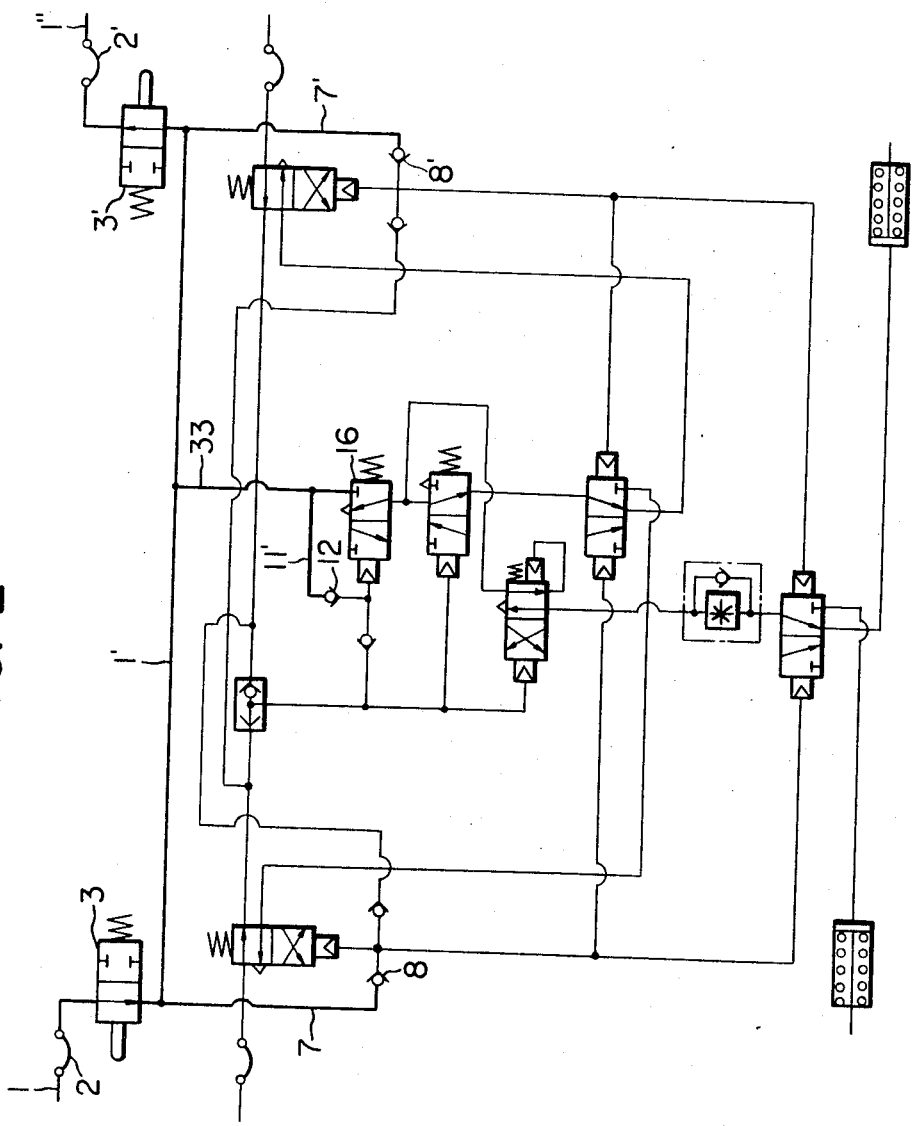
FIGS. 2 to 5 are schematic diagrams illustrating the operation of the system shown partly in FIG. 1.

More precisely, FIG. 2 shows the state of the parts of the system in the first car when air under low pressure is supplied to the actuating air supply line. In FIG. 2, conduits through which air under low pressure is flowing are shown by the thick lines. Suppose that the locomotive is connected to the left-hand side of the car. Then, air under low pressure passes through the actuating air supply conduit 1, connecting conduit 2 and cut-off valve 3 into the actuating air supply conduit 1', thence through the cut-off valve 3' and connecting circuit 2' into the actuating air supply conduit 1'' in the right-hand car. In this manner, compressed air is supplied to the cut-off valve at the rear end of the rearmost car. The cut-off valve in the rearmost car is urged to its closed or shut-off position in response to the disconnecting operation of the coupler.

As shown by the thick lines in FIG. 2, compressed air flows into the branched conduits 7 and 7' but cannot flow any further by being shut off by the check valves 8 and 8'. Further, compressed air flows into the supply pressure self-holding change-over valve 16 through the conduit 33 branched from the mid point of the conduit 1', but this valve 16 is in the shut-off position. Compressed air flowing into the conduit 11' branched from the conduit 33 is shut off by the check valve 12. Such a state occurs successively in the cars starting from the first car when the operator in the locomotive manipulates the compressed air control valve to supply air under low pressure into the actuating air supply line.

Figure 3:
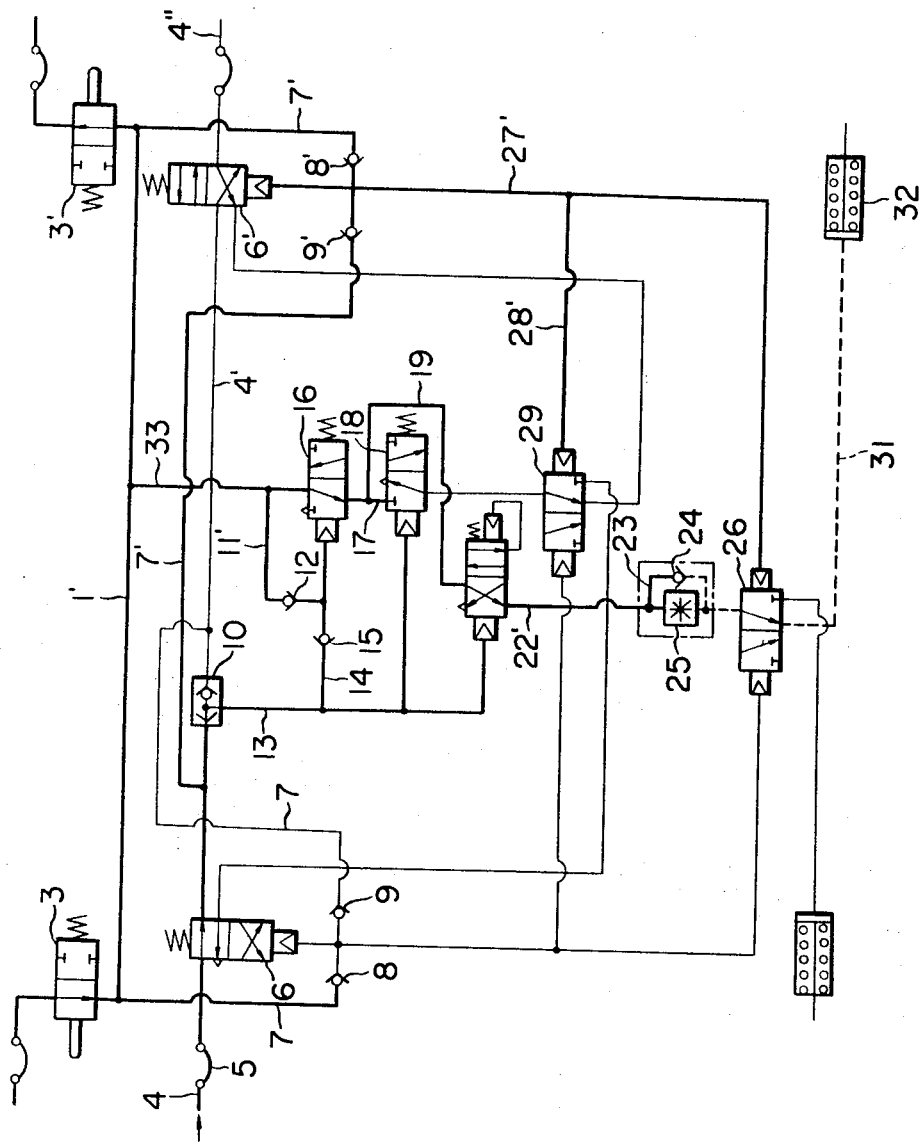

FIG. 3 shows the state of the parts of the system in the first car when the operator manipulates the on-off control valve to charge the instruction air line with compressed air after the operation above described. Compressed air supplied by way of the instruction air conduit 4 passes through the connecting conduit 5, instruction direction change-over valve 6, conduit 7', check valve 9' and conduit 27' to apply a pilot air pressure to the instruction direction change-over valve 6', to the unlocking air cylinder change-over valve 26 and to the instruction direction change-over valve 29, with the result that these valves take positions as shown. Further, compressed air passes through the left-hand portion of the double check valve 10, conduit 13, pilot conduit 14 and check valve 15 to apply a pilot air pressure to the supply pressure self-holding change-over valve 16, with the result that this valve 16 is changed over to a position as shown thereby permitting supply of compressed air from the conduit 1' to the locked position self-holding change-over valve 20 by way of the conduits 33, 17 and 19.

Compressed air passing through another pilot conduit 21 branched from the conduit 13 applies a pilot air pressure to the instruction air change-over valve 18, with the result that the valve 18 is changed over to a position as shown thereby shutting off air supplied by way of the conduit 17. Compressed air passing through the condit 13 applies a pilot air pressure to the locked position self-holding change-over valve 20, with the result that this valve 20 is changed over to a position as shown and the conduit 19 communicates with the conduit 22'. Compressed air is supplied from the conduit 22' to the pressure controlled change-over valve 25 and to the check valve 24 through a branch conduit 23 to be shut off thereby. The pressure controlled change-over valve 25 is not responsive to air under low pressure (about 3 Kg/cm²), but it is opened in response to the application of air under high pressure (about 6 Kg/cm²) so that such compressed air is supplied through the valve 25 to the unlocking air cylinder change-over valve 26. Due to the fact that compressed air is supplied from the conduit 27' to one of the control ports of this change-over valve 26, compressed air passes through the valve 26 and conduit 31 to be supplied to unlocking cylinder 32.

Figure 4:
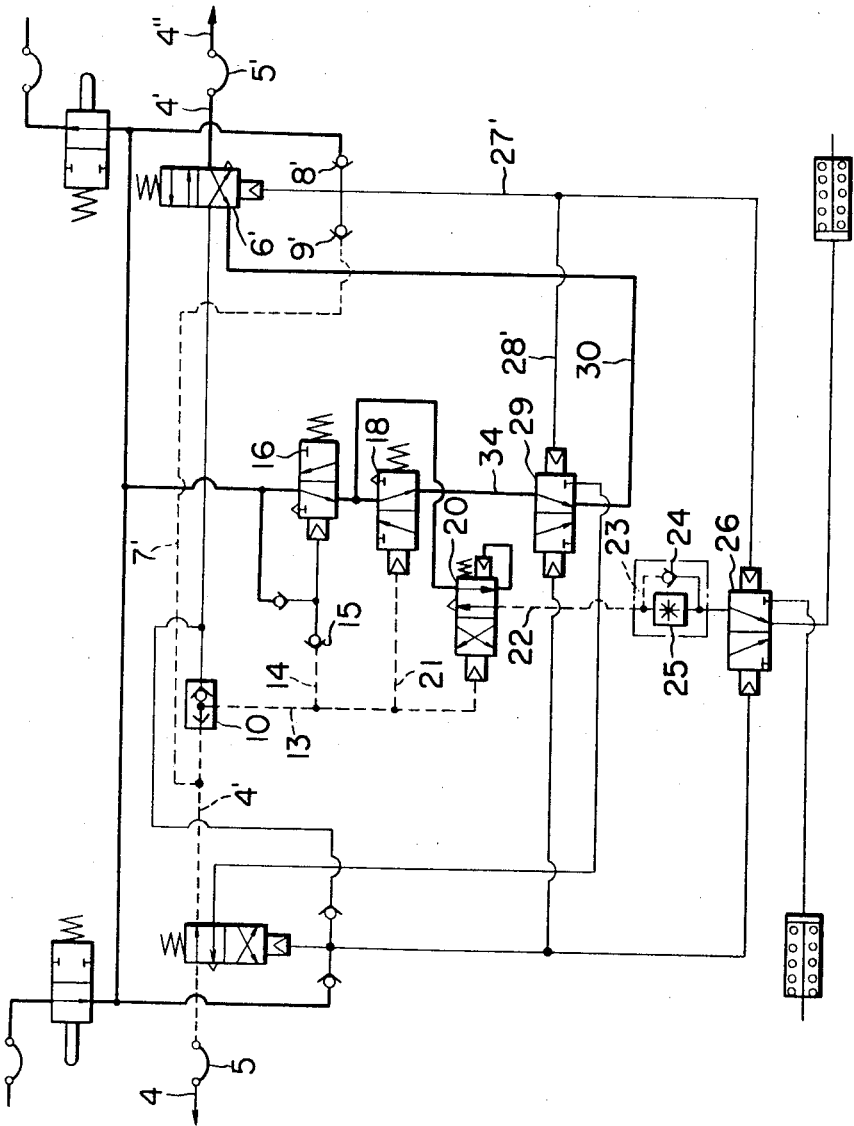

When, therefore, it is desired to disconnect the first car, the operator may turn on the on-off control valve once and then manipulate the compressed air control valve to supply air under high pressure into the actuating air supply conduit 1. As soon as air under high pressure is supplied, the unlocking cylinder 32 is actuated to release the coupler, and at the same time, the cut-off valve 3' at the rear end of the first car is urged to its shut-off position. When, however, this first car is not a car to be disconnected, air under low pressure within the instruction air conduit 4' is exhausted in response to the subsequent turn-off of the on-off control valve by the operator and the parts of the system take a state as seen in FIG. 4. (In FIGS. 4 and 5, the conduits which are exhausted are shown by the broken lines). More precisely, in response to the turn-off of the on-off control valve, exhaust of compressed air takes place in the portion of the conduit 4' between the connecting conduit 5 and the double check valve 10, in the portion of the conduit 7' between the point 35' and the check valve 9', in the conduits 13 and 21, and in the portion of the conduit 14 between the junction point and the check valve 15 as seen in FIG. 4. Further, the locked position self-holding change-over valve 20 is changed over to the position shown and compressed air in the conduits 22 and 23 is also exhausted. Due to the fact that the instruction air change-over valve 18 and the locked position self-holding change-over valve 20 are changed over to the position shown in FIG. 4, supply of compressed air from the actuating air supply conduit 1' to the unlocking air cylinder change-over valve 26 is interrupted, and compressed air is supplied to the instruction air conduit 4'' of the next adjacent or second car through the conduit 34, instruction direction change-over valve 29, conduit 30, instruction direction change-over valve 6', instruction air conduit 4' and connecting conduit 5'. Thus, the parts of the system in the second car take a state as shown in FIG. 3.

Figure 5:
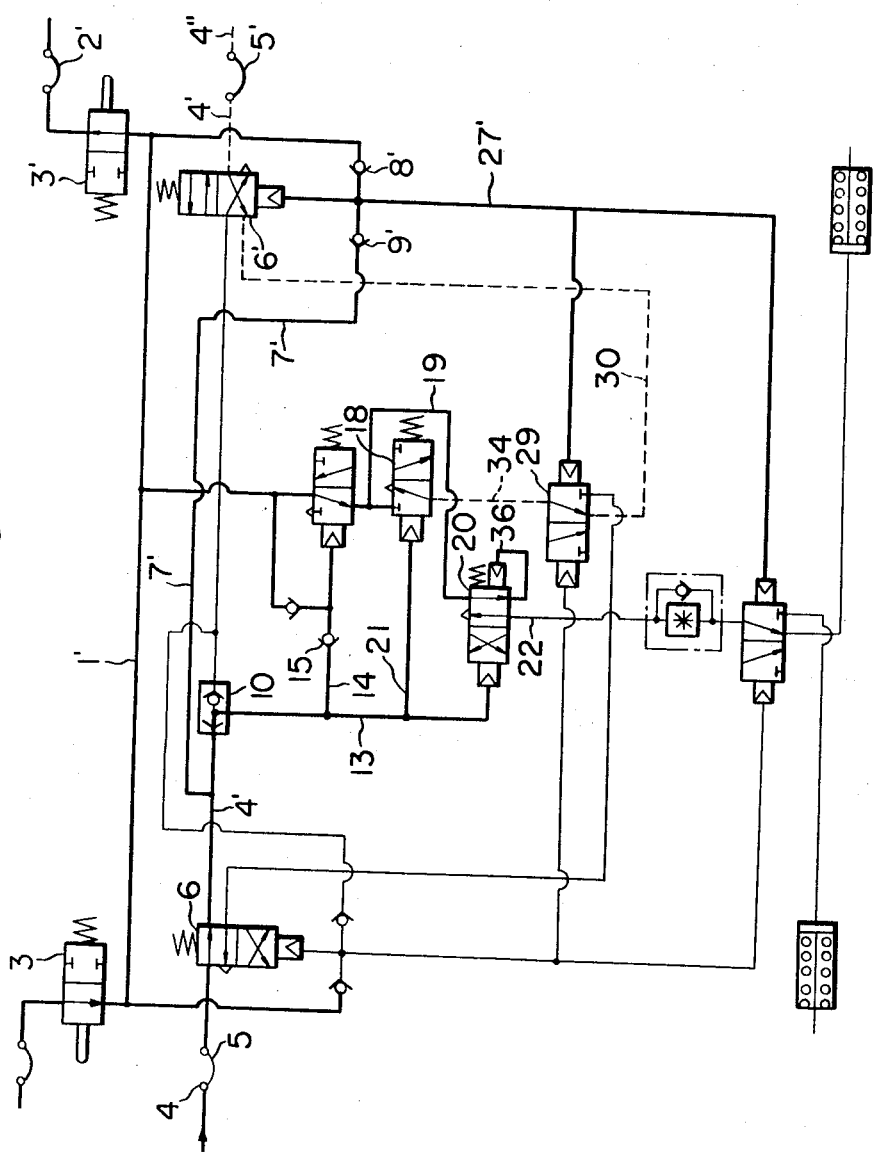

Then, when the operator urges the on-off control valve to the on position again, compressed air is supplied into the instruction air line and the state of the elements is changed over to a state as shown in FIG. 5. Thus, compressed air is supplied into the exhausted conduits again and the instruction air change-over valve 18 is restored to the original position. However, the locked position self-holding change-over valve 20 remains in the position shown in FIG. 2 due to the fact that compressed air supplied from the conduit 19 passes through the valve 20 to be supplied to a self-holding pilot air conduit 36 thereby acting to hold the valve 20 in the locked position. Therefore, even when air under high pressure is supplied by way of the actuating air supply line, such air is shut off by this valve 20 and cannot reach the unlocking cylinder 32. Further, compressed air in the conduit 30 passes through the instruction direction change-over valve 29 and conduit 34 to be discharged to the atmosphere by the instruction air change-over valve 18. Thus, the instruction air conduit 4'' in the next adjacent or second car connected to the conduit 30 is also exhausted, and the elements in the second car take a state as shown in FIG. 4. The elements in the third car in the train take a state as shown in FIG. 3, and compressed air is supplied to the instruction air conduit in the third car.

In this manner, compressed air is successively supplied to the instruction air conduits in the succeeding cars and the instruction air conduits are repeatedly charged and exhausted in response to the on-off manipulation of the on-off control valve by the operator. After repeating the on-off cycles by the number of times corresponding to the car number of the desired car counting from the first car, the operator changes over the compressed air control valve for supplying air under pressure to the actuating air supply line. Air under high pressure flows at a high speed to the actuating air supply conduit in the desired car to be disconnected thereby actuating the unlocking cylinder in such car for releasing the coupler. It will be understood that the cars may be connected in any direction without any limitation to their orientation due to the fact that the cut-off valves 3 and 3', instruction direction change-over valves 6 and 6', conduits 7, 7', 27, 27', 28, 28', 30, 30', 31 and 31', and unlocking cylinders 32 and 32' in each car are arranged symmetrically with respect to the longitudinal direction of the car. One of the symmetrically arranged elements in each pair of such elements may be eliminated as required. In this case, the system is unidirectional and the cars must be connected in one and the same direction only.

The present invention having the features set forth hereinabove provides the following advantages:

1. The present invention which utilizes a fully pneumatic, control is simple in arrangement and substantially trouble-free and can reliably operate. Thus, the present invention can be advantageously applied to special freight cars for conveying dangerous materials which are affected by electric sparks.
2. The operation for the disconnection of any desired car can be quite simply carried out since the operator may merely repeat the on-off of an on-off control valve by the number of times corresponding to the specific car number. Thus, the system is useful in many practical applications.
3. In the present invention, compressed air is supplied by way of an actuating air supply line, and charge and discharge of air are repeated in the successive cars starting from the first car in response to the on-off operation by the operator until the desired car to be disconnected is selected. Further, air under high pressure is used for the disconnection of the desired car. Thus, the pneumatically operated system of the present invention can relatively quickly carry out the car disconnecting operation with a short waiting time. Further, the system can operate accurately with high reliability.
4. A car can be disconnected from a train at any side irrespective of the direction in which the car is connected in the train. Further, the system may be made unidirectional by eliminating parts of the system, whereby the system can be made less expensive.

What is claimed is:

1. A method of disconnecting any desired car from a train of cars comprising laying an actuating air supply line through the train from a source of compressed air in the foremost car for the purpose of selectively supplying air under low pressure and air under high pressure through said line, laying an instruction air line through the train from said compressed air source for the purpose of selecting the desired car to be disconnected by the instruction air supplied through said instruction air line, branching from the actuating air supply line portion in each car a compressed air piping for supplying compressed air to coupler unlocking means through a supply pressure self-holding change-over valve, an instruction air change-over valve, a locked position self-holding change-over valve and a pressure controlled valve, branching from the instruction air line portion in each car a pilot air piping for controlling said three change-over valves, supplying air under low pressure into said actuating air supply line, repeating the on-off of on-off control means in the foremost car by the number of times corresponding to the car number of the desired car to be disconnected thereby causing alternate charge and discharge of compressed air in the instruction air line portions in the cars until the desired car is selected and the instruction air line portion in the desired car is charged with compressed air, supplying air under high pressure into said actuating air supply line for actuating said pressure controlled valve in the desired car thereby releasing the coupler of the desired car.

2. A system for disconnecting any desired car from a train of cars comprising an actuating air supply line (1) extending through the train from a source of compressed air in the foremost car so that air under low pressure and air under high pressure can be selectively supplied through said line, an instruction air line (4) extending through the train from said compressed air source so that the desired car to be disconnected can be selected by the instruction air supplied through said line, a pair of cutoff valves (3, 3') disposed at the opposite ends of the actuating air supply line portion (1') in each car, a pair of conduits (7, 7') branched from the opposite ends of said actuating air supply line portion (1') to be connected to the instruction air line portion (4') in each car through check valves, a supply pressure self-holding change-over valve (16), an instruction air change-over valve (18), an instruction direction change-over valve (29) whose opposite control ports are connected to conduits branched from said conduits (7, 7') a pair of direction change-over valves (6, 6') disposed adjacent to the opposite end of said instruction air line portion (4'), a compressed air piping branched from an intermediate position of said actuating air supply line portion (1') to communicate with said direction chang-over valves (6, 6') through said supply pressure self-holding change-over valve (16), said instruction air change-over valve (18) and said instruction direction change-over valve (29), said compressed air piping including a conduit (17) connecting between said change-over valves (16, 18), a conduit (19) connected to said conduit (17) and communicating with a locked position self-holding change-over valve (20) to serve as a pilot air supply conduit for holding said change-over valve (20) in the locked position, a pair of selectively actuated unlocking cylinder means (32, 32') connected to said locked position self-holding change-over valve (20) through a pressure controlled valve (25), a double check valve (10) disposed intermediate the opposite ends of said instruction air line portion (4'), and pilot air supply conduits (14, 21, 13) leading from said double check valve (10) to the control ports of said supply pressure self-holding change-over valve (16), said instruction air change-over valve (18) and said locked position self-holding change-over valve (20), said conduit (14) communicating with the actuating air supply line portion (1') by way of a check valve (15), a conduit (11) branched from between said check valve (15) and the control port of said change-over valve (16) and a check valve (12), whereby the desired car can be disconnected from the next adjacent car irrespective of the direction in which the car is connected in the train.

* * * * *